(12) United States Patent
Edwards

(10) Patent No.: US 7,085,934 B1
(45) Date of Patent: Aug. 1, 2006

(54) METHOD AND SYSTEM FOR LIMITING PROCESSOR UTILIZATION BY A VIRUS SCANNER

(75) Inventor: Jonathan Edwards, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 695 days.

(21) Appl. No.: 09/626,701

(22) Filed: Jul. 27, 2000

(51) Int. Cl.
    *G06F 11/30* (2006.01)
    *G06F 9/46* (2006.01)
    *G06F 17/00* (2006.01)

(52) U.S. Cl. .................. 713/200; 718/102; 715/781; 702/186

(58) Field of Classification Search ............... 713/188, 713/200, 201; 718/100, 102, 104, 105; 714/38; 715/700, 764, 781, 788; 702/127, 182, 186; 345/700, 764, 781, 788
See application file for complete search history.

(56) References Cited

U.S. PATENT DOCUMENTS

| | | | | |
|---|---|---|---|---|
| 5,623,598 A | * | 4/1997 | Voigt et al. ................ 714/47 |
| 5,812,844 A | | 9/1998 | Jones et al. ............... 395/674 |
| 6,029,256 A | * | 2/2000 | Kouznetsov ................. 714/38 |
| 6,035,423 A | * | 3/2000 | Hodges et al. ............... 714/38 |
| 6,108,683 A | * | 8/2000 | Kamada et al. ............. 718/103 |
| 6,301,668 B1 | * | 10/2001 | Gleichauf et al. .......... 713/201 |
| 6,499,107 B1 | * | 12/2002 | Gleichauf et al. .......... 713/201 |
| 6,584,488 B1 | * | 6/2003 | Brenner et al. ............ 718/103 |
| 6,668,269 B1 | * | 12/2003 | Kamada et al. ............. 718/103 |

OTHER PUBLICATIONS

Douceur et al, "Progress-based regulation of low-importance processes" Dec. 1999, 17$^{th}$ ACM Symposium on Operating System Principles, Published in Operating System Review, p. 247–260.*

"Dr. Solomon's Anti-Virus Toolkit", Nov. 1997, Dr. Solomon's Software Ltd., Edition 1.0, p. 67–69, 75–82.*

* cited by examiner

Primary Examiner—Christopher Revak
(74) Attorney, Agent, or Firm—Zilka-Kotab, PC; Christopher J. Hamaty

(57) ABSTRACT

A method for limiting processor utilization by a virus scanner operable to scan data for viruses. The method includes defining a processor utilization level and running the virus scanner. The running of the virus scanner is temporarily suspended so that usage of the processor is generally limited to said processor utilization value.

22 Claims, 7 Drawing Sheets

METHOD AND SYSTEM FOR LIMITING PROCESSOR UTILIZATION BY A VIRUS SCANNER

BACKGROUND OF THE INVENTION

The present invention relates generally to a virus detection system and method, and more particularly, to a system and method for limiting processor utilization by a virus scanner.

A huge surge in computer viruses has occurred in the last decade. Computer viruses have gone from an academic curiosity to a persistent, worldwide problem. Today, viruses affect vast numbers of computers in locations throughout the world. A computer virus is generally a manmade destructive computer program or code that is loaded onto a computer system without the knowledge of the user. The computer virus is often a self-replicating program containing code that explicitly copies itself and can infect other programs by modifying them or their environment. Even a simple virus can be dangerous as the virus can quickly use a large portion of the available memory and possibly bring down the computer system.

Viruses can be written for, and spread on, virtually any computing platform. A virus can infect, or become resident in almost any software component, including an application, operating system, system boot code, or device driver. Computer viruses spread by attaching themselves to other programs (e.g., word processing or spreadsheet applications) or to a boot sector of a disk. When an infected file is activated or executed, or when the computer is started from an infected disk, the virus is also executed and attempts to infect other files. Since a virus is software code, it can be transmitted along with any legitimate software that enters the computer environment. Some viruses are capable of transmitting themselves across networks and bypassing security systems. For example, a virus can spread to files on a local area network (LAN) based file server, and from there to other client systems attached to the server. Similarly, systems that run programs from wide area network (WAN) file servers can become infected if the programs on the server are susceptible to infection. In the networked world of the internet, viruses can rapidly spread.

The term virus generally refers to any destructible or harmful program or code that attempts to hide its possibly malicious function or tries to spread onto as many computers as possible. One common type of virus is a macro virus which is encoded as a macro embedded in a document. Many applications support macro languages which allow the user to embed a macro in a document and have the macro execute each time the document is opened. Once a computer system is infected with a macro virus, the virus can embed itself in all future documents created with the associated application.

Another common virus is a boot sector virus which replaces the computer system's master boot record with its own code. The boot sector virus is a small program executed each time a computer boots. The virus infects floppy disks and hard disks by inserting itself into the boot sector of the disk, which contains code that is executed during the system boot process. Since the master boot record executes every time the computer is started, the boot sector virus can be very dangerous to the integrity of the computer system. The boot sector virus typically enters the computer system through a floppy disk installed in the floppy drive when the computer system is started.

Another type of virus, which is often difficult to detect, is a polymorphic virus. This virus produces varied but operational copies of itself Code within the virus includes an encryption routine to help the virus hide from detection, plus a decryption routine to restore the virus to its original state when it executes.

A Trojan horse is another type of virus which masquerades as a legitimate software program. The Trojan horse generally does not replicate. It waits until its trigger event occurs and then displays a message or destroys files or disks.

A computer worm is another type of virus that can replicate itself and use memory but cannot attach itself to other programs. The computer worm is a self-contained program, or set of programs, that is able to spread functional copies of itself or its segments to other computer systems, usually via network connections. Host computer worms are entirely contained in the computer they run on and use network connections only to copy themselves to other computers. Network worms consist of multiple parts (called "segments"), each running on different machines and using the network for several communication purposes.

Many antivirus programs have become commercially available for protection against viruses. There are three main types of antivirus software: activity monitors, scanners, and integrity checkers. Activity monitoring programs attempt to prevent infection before it happens by looking for virus type activity, such as attempts to reformat a disk Scanners are the most widely used type of antivirus program. Virus scanners generally operate in batch mode, scanning all files on a system, hard disk, or floppy disk, when requested by the user, or at set intervals. They look for known viruses by searching disks and files for scan strings or patterns. A scanner may be designed to examine specified disks or files on demand, or it may be resident, examining each program that is about to be executed. Most scanning programs include an update feature that allows the antivirus program to download profiles of new viruses from the Internet so that the program can check for new viruses soon after they are discovered. Most scanners also include virus removers which are operable to clean infected files. One example of an antivirus scanner is McAfee's VSHIELD.

The third type of antivirus software, integrity checkers, compute a small checksum or hash value for files which are presumably uninfected, and later compare newly calculated values with the original ones to see if the files have been modified. These programs catch unknown viruses as well as known ones. As with scanners, integrity checkers may be called to check entire disks or they may be resident, checking each program that is about to be executed.

Most of the antivirus software available today, such as conventional device resident antivirus scanners, require a large amount of memory and processor resources. Virus scanners often perform their virus scanning operations while a user is working on the computer and running programs or applications that also utilize the computer's CPU (central processing unit). On-demand virus scanners may be configured, for example, to check a computer's hard drive on a scheduled basis or upon a user request. The on-demand virus scanner walks through a directory tree and passes each file to the virus scan engine to be scanned for viruses. Since the scan engine requires much of the CPU's resources, the on-demand scan processes running in the background often interfere with normal operation of the computer. Thus, the user has to either wait for the virus scanner to complete its scanning operation or work with slow running applications until the virus scan is complete.

One method for reducing CPU utilization by the scanner is to limit the rate at which the scanner walks a directory and passes files to the engine. However, some files require more processing resources than others, thus there may still be peaks in CPU utilization.

During the scanning process, the scanner may receive callbacks from the engine indicating, among other things, the progress the engine has made scanning each file. The scanner can use these callbacks as an opportunity to sleep, thus, self-limiting the amount of CPU it is using. However, the rate at which the callbacks occur is heavily dependent on the type of file being scanned. This method, therefore, does not provide a consistent reduction in CPU utilization.

There is, therefore, a need for a system and method for scanning files for viruses while limiting the amount of computer resources the scan engine utilizes to reduce interference with other applications running on the computer.

SUMMARY OF THE INVENTION

A method and system for limiting processor utilization by a virus scanner are disclosed. Several inventive embodiments of the present invention are described below.

The method includes defining a processor utilization level and running the virus scanner. The running of the virus scanner is temporarily suspended so that usage of the processor is generally limited to said processor utilization value.

The processor utilization level may be a maximum processor usage value or an average value. The method may include providing a graphical user interface to a user to allow the user to select the processor utilization level. The utilization level may also be defined as a default value.

A system for limiting processor utilization by a virus scanner generally comprises a virus scanner operable to scan data for viruses and a processor operable to execute a scanner thread to scan the data The system further includes a controller configured to temporarily suspend execution of the scanner thread to limit processor utilization by the virus scanner.

In another aspect of the invention, a computer program product generally comprises computer code that defines a processor utilization level, computer code that runs the virus scanner, and computer code that temporarily suspends running of the virus scanner so that usage of the processor is generally limited to the processor utilization value. The product further includes a computer readable medium that stores the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
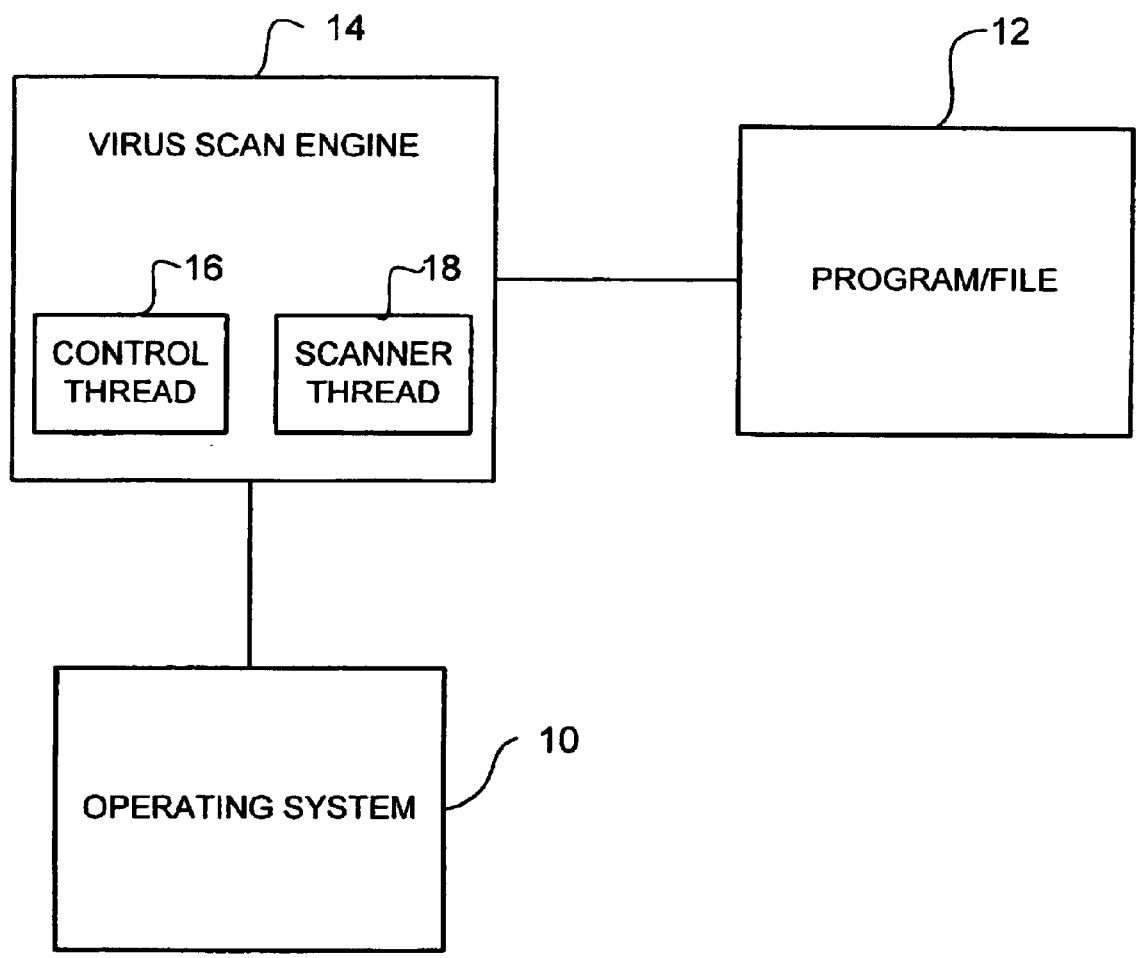
FIG. 1 is a block diagram illustrating a virus scan engine of the present invention.

Referring now to the drawings, and first to FIG. 1, a block diagram illustrating the interaction between an operating system 10, a computer program, file (or other data) 12 and a virus scan engine 14. As described below, the virus scanner includes a control thread 16 which controls CPU usage by a scanner thread 18 that is used in conjunction with the scan engine 14 to scan files for viruses. The system of the present invention allows a user to limit CPU utilization by the virus scan engine 14 to reduce the impact of virus scanning on the performance of other applications running on the user's computer when a virus scan is performed. The computer system on which the virus scan is performed may be a stand-alone desktop computer, laptop computer, handheld computer, or a mainframe computer, for example. The computer may also be configured for use as a server or other networked computer. One skilled in the art of computer systems will understand that the present invention is not limited to a particular class or model of computer.

Figure 2:
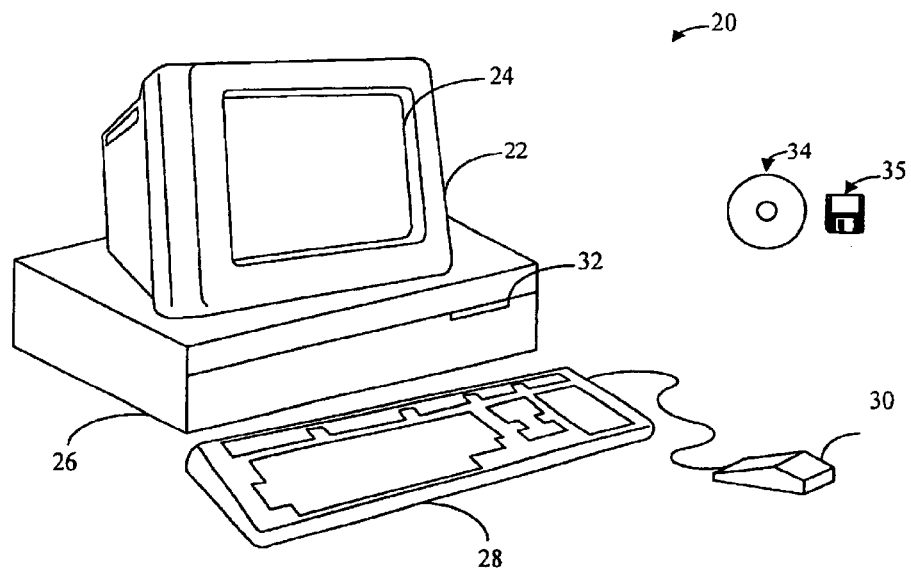
FIG. 2 is a schematic illustrating an example of a computer system that can be utilized to execute software of an embodiment of the invention.

FIG. 2 illustrates an example of a computer system 20 that can be used to execute software of an embodiment of the invention. The computer system 20 includes a display 22, screen 24, cabinet 26, keyboard 28, and mouse 30, which may include one or more buttons for interacting with a GUI (Graphical User Interface). Cabinet 26 houses a CD-ROM drive 32, system memory 42 and fixed storage 44 (see FIG. 3) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium. The computer system 20 may function through use of an operating system such as WINDOWS, DOS, UNIX, or LINUX, for example. It is to be understood that other operating systems may be used without departing from the scope of the invention. The operating system is preferably a multitasking system so that a number of different programs are allowed to execute simultaneously on a single processor.

Figure 3:
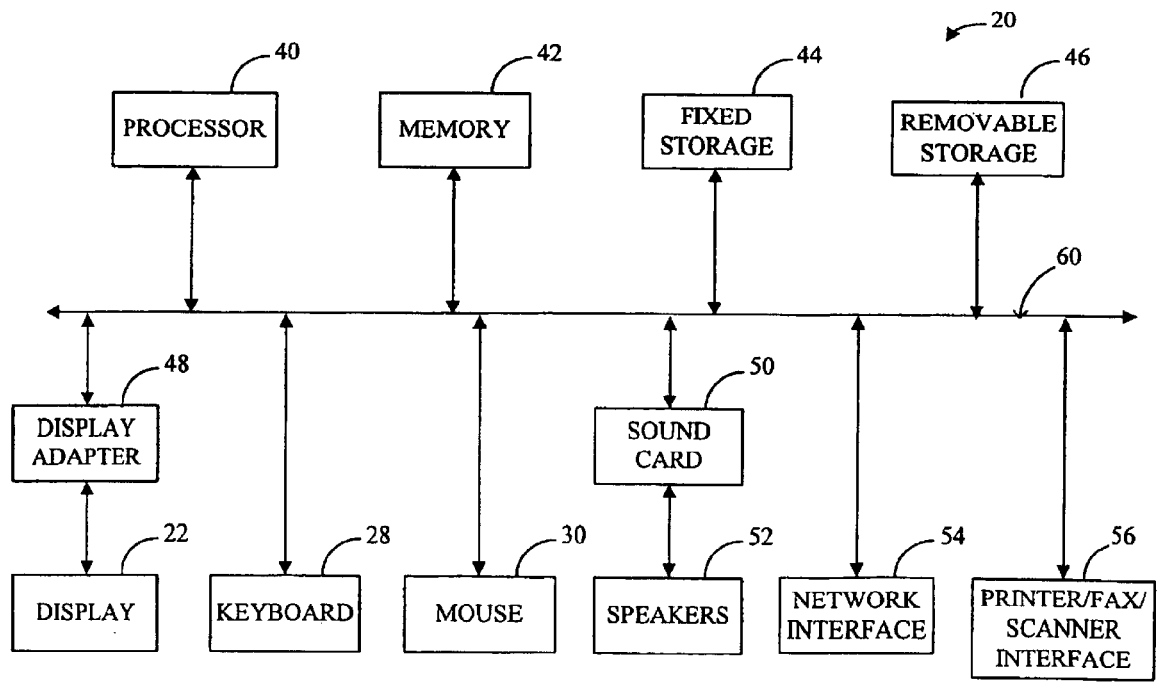
FIG. 3 is a system block diagram of the computer system of FIG. 2.

FIG. 3 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (e.g., speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 3. However, these arrows are only illustrative of one possible interconnection scheme serving to link the subsystems. For example, a local bus could be utilized to connect the central processor 40 to the system memory 42 and display adapter 48. Computer system 20 shown in FIGS. 2 and 3 is but an example of a computer system suitable for use with the invention. Other computer architectures having different configurations or subsystems may also be utilized.

The virus scan engine 14 is configured to run an antivirus program such as McAfee's VSHIELD, ACTIVESHIELD, SCAN NOW or VIRUS SCAN program, or antivirus applications described in U.S. Pat. No. 6,029,256, issued Feb. 22, 2000 or U.S. Pat. No. 6,035,423 issued Mar. 7, 2000, which are incorporated herein by reference, or any other suitable antivirus program. The antivirus program preferably provides on-demand scanning which allows the virus scanner to scan files on a scheduled basis or upon request by a user. The user may scan, for example, an entire hard drive, a removable disk, a group of files or programs, or any other code stored in any type of memory accessible by the scan engine 14. The memory may be internal to the computer or accessible by the computer through a network connection, serial connection, or any other type of connection.

In a typical configuration, the antivirus application is used in conjunction with a set of virus signature files which are also placed in a directory on the user's hard drive. The antivirus program may contain an update agent which is resident in the background of the computer system 20 and polls for updates at a set interval. For example, the program may poll a server daily to check for new virus signature files or new scan engine libraries. Update component versions may be posted on an application server provider (ASP) page located on the Internet, which reports back whether there are newer versions of any of the listed components. This data may be displayed in a browser window which the user can log into and download updated components. It is to be understood that the preferred embodiment of the invention may be applied to many different types of virus scanning engines.

When a user program runs on a computer, the computer's operating system first loads the main program file into system memory. The program file includes several objects stored as data or text, and instructions for handling the data and other parameters which may be input during program execution. The processors use logical addresses to access file objects, and these logical addresses correspond to physical addresses in RAM. Binding of instructions and data to physical memory address is accomplished by compiling the program file using code which is indexed (linked) to physical memory by the operating system during loading of the file. The computer program can be broken down into a collection of processes which are executed by the processor. A process is a set of resources, including logical addresses, process limits, permissions and registers, and at least one execution stream. The smallest unit of operation to be performed within the process is referred to as a thread. The thread is the actual component of the process that is executing at one time. The use of threads in modern operating systems is well known. Threads allow multiple execution paths within a single address space to run concurrently on a processor. At any given time, only one thread can actually be executed by a CPU. The CPU will continue running the same thread until one of several things happen. The thread might voluntarily yield control to give other threads a chance to run. The thread might have to wait for some asynchronous event to occur, or the thread might use up its allotted slice of time and be suspended to allow other threads to run.

As further described below, the system of the present invention utilizes a control thread 16 to suspend the scanner thread 18 to allow other threads to run (FIG. 1). The control thread 16 periodically asks the operating system 10 to suspend or unsuspend the scanner thread 18. When suspended, the scanner thread 18 will not be selected by the operating system 10 for execution. When unsuspended, the operating system 10 is free to run the scanner thread 18. The control thread may run as part of the scan process, or as part of another process running in conjunction with the virus scanning. The control and scanner threads 16, 18 may be represented by a data structure called an execution context, which contains state information about the execution of the thread, such as register and stack contents. When the operating system suspends the scanner thread 18 in favor of the execution of another thread it copies the information from the registers and stack to the thread's execution context. When the operating system subsequently reselects the scanner thread 18 for execution after suspending another thread, it copies the information in the scanner thread's execution context back to the actual registers and stack. In this way, the thread continues executing with the same register and stack contents as when it was suspended.

The CPU usage during virus scanning may be controlled with the control thread 16 by either setting a maximum allowable percent of CPU usage or allowing the CPU usage to fluctuate up to 100% while ensuring that the average CPU usage remains close to a predetermined percentage, as described below. A default method such as setting a maximum CPU usage may be defined in the scanner application. The higher the percentage of CPU designated for the scan engine 14, the quicker the virus scanning will be complete. However, if a large percentage of CPU is utilized by the scanner, the other applications running on the computer will be slowed down. Thus, if the user does not want the scanner to interfere with normal operation of the computer, a low percentage value (e.g., less than 40%) should be selected. The user may select a value for CPU usage or a default value (e.g., 33%) may be used.

Figure 4:
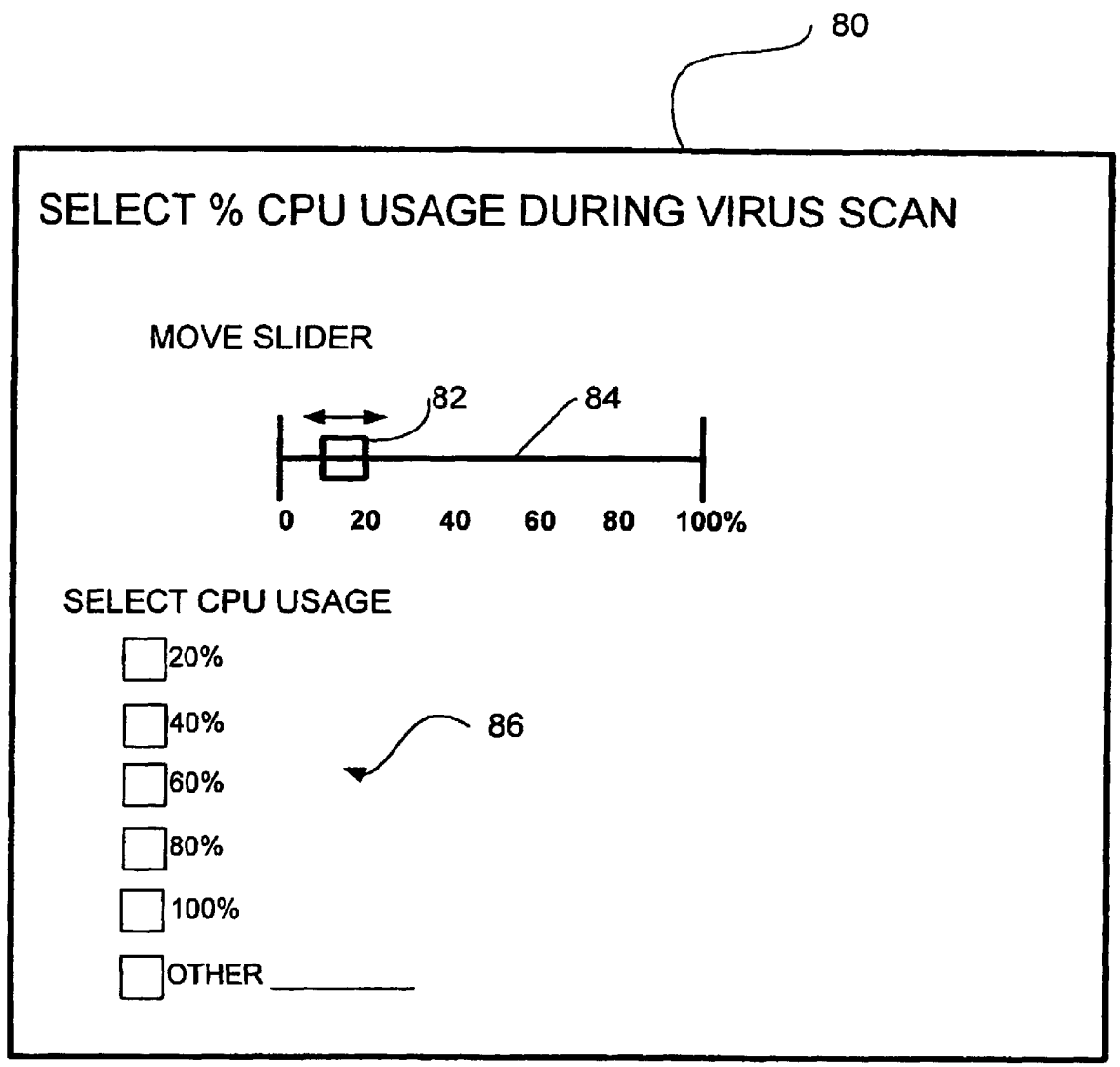
FIG. 4 is a dialog box displayed on a screen of a computer to allow a user to select a preferred utilization of CPU by the virus scan engine.

The system may include a graphical user interface (GUI) which allows the user to select a preferred CPU usage by the scanner. For example, a dialog box 80, such as shown in FIG. 4 may be presented to a user so that the user can select the percentage of CPU usage permitted by the scan engine 14. As shown in FIG. 4, the user may move a slider 82 by placing a mouse over the slider and moving the mouse along the horizontal line 84, for example. The user may instead select one of the listed CPU percentages, generally indicated at 86, or type in a specific value. The box 80 may be presented to the user when the user schedules a periodic virus scan or when the user decides to run an on-demand scan. The box 80 may also appear on the display screen at the scheduled time for the virus scan, since the selection may depend on which applications the user is currently running or which files are being scanned. It is to be understood that the dialog box 80 is only one example of a graphical user interface that may be used to specify a desired CPU usage by the scan engine 14.

Figure 5:
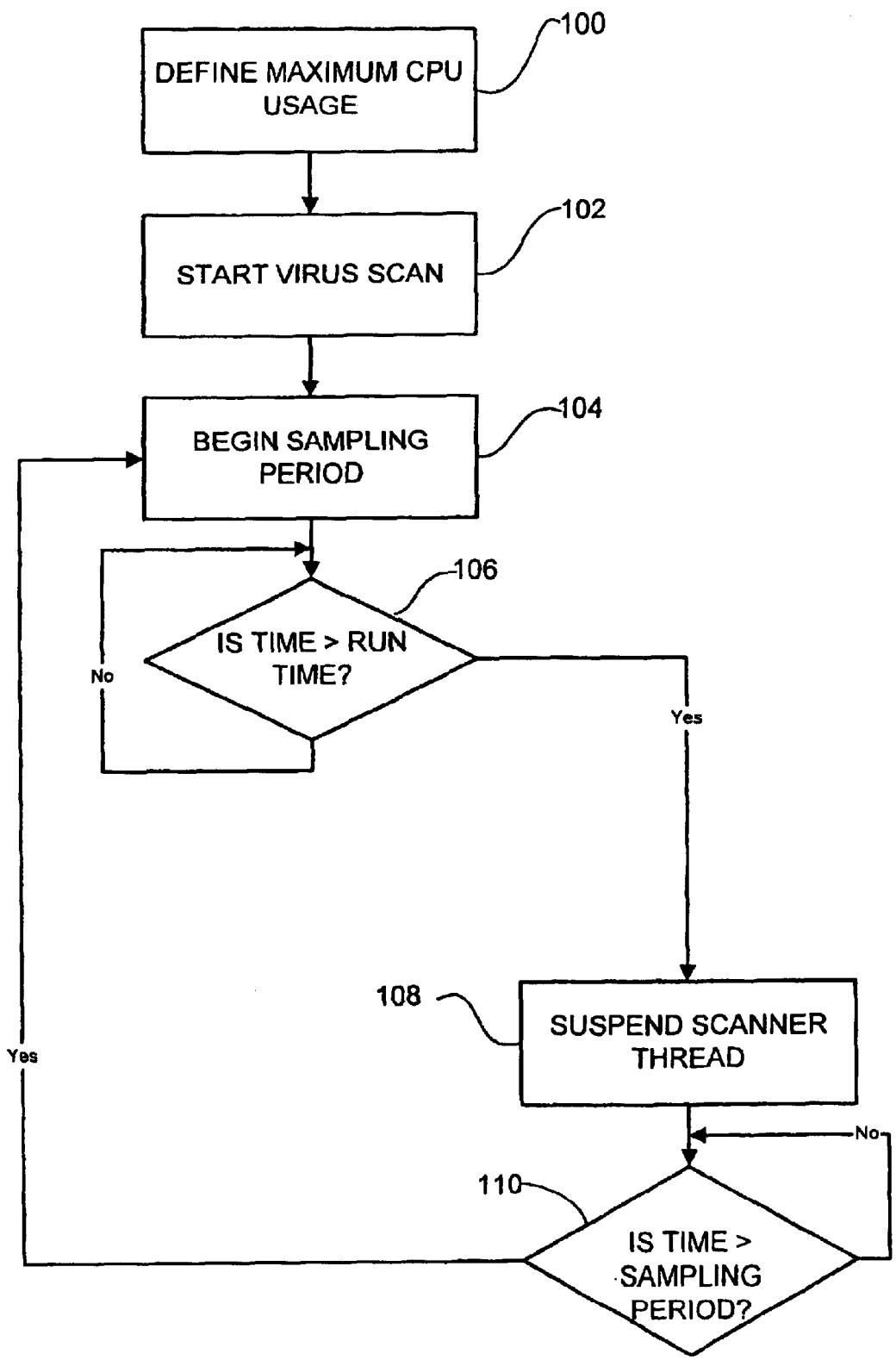
FIG. 5 is a flowchart illustrating a process for limiting the maximum CPU usage by the scan engine.
Figure 6:
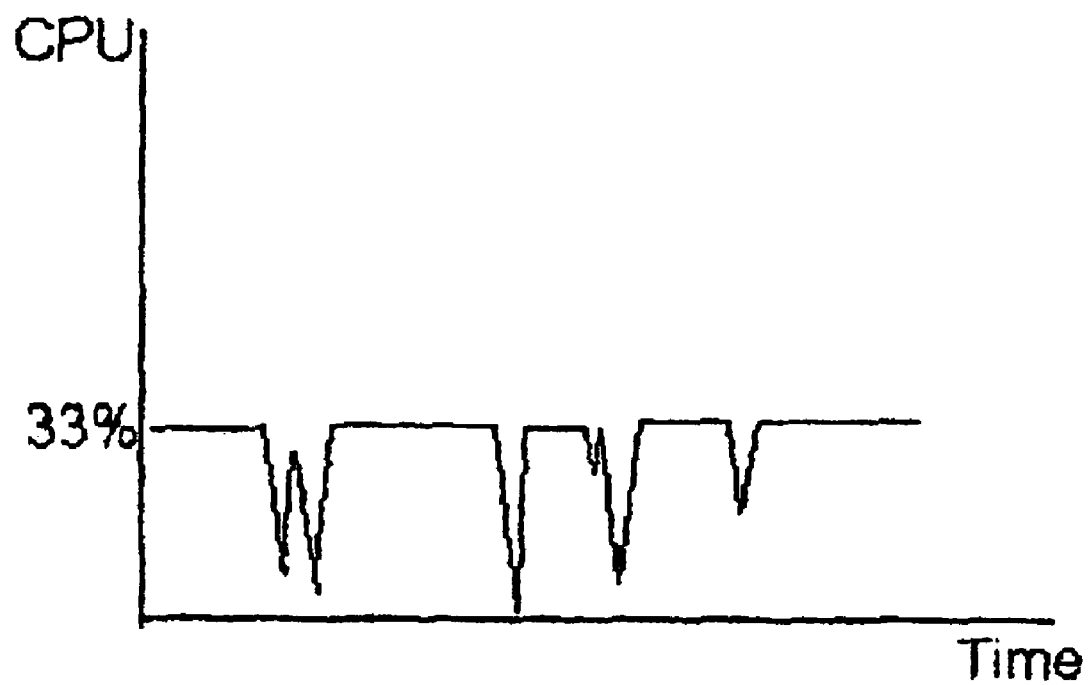
FIG. 6 is a graph of percent CPU usage by the scan engine versus time with the maximum CPU usage set at 33% in the process shown in FIG. 5.

A process for limiting the CPU usage by the scan engine 14 to a maximum value is illustrated in the flowchart of FIG. 5. An exemplary graph of CPU usage versus time is shown in FIG. 6. As can be observed from the graph, the scanner thread may not be able to use all of the available processor bandwidth when it is running. Thus, the actual percentage of CPU usage by the scan engine 14 may drop below the maximum allowable value, however, it preferably does not rise above this maximum value. The CPU usage is calculated over a time period (sampling period) over which CPU measurements are made. For example, if in a one second sampling period, the scanner thread 18 is executing for 330 ms and not executing for 670 ms, it has 33% processor usage. The reason that the scanner thread 18 may not use the processor the entire time that it is allowed to run is that it may be waiting for data from an external device or may not have been scheduled by the operating system.

In order to limit the CPU usage, the control thread 16 periodically suspends the scanner thread for a time equal to:

(1-fraction CPU allowed)*sampling period.

where:

fraction CPU allowed is the maximum CPU percentage value; and sampling period is the time period over which CPU usage measurements are made.

For example, if the user allows for a maximum of 33% of the available CPU resources to be utilized by the scanner and the control thread 16 runs on a one second sampling period then the suspend time of the scanner thread 18 will be equal to:

(1−0.67)*1 second=0.33 second.

Thus, the scanner thread 18 will run for 330 ms and be suspended for 670 ms during the one second sampling period.

As shown in the flowchart of FIG. 5, the user first defines the maximum CPU usage permitted by the scan engine 14 at step 100. This value may also be defined as a default value, rather than selected by the user. The virus scan then begins at the start of a first sampling period (steps 102 and 104). The scanner thread 18 runs until it reaches the end of its run time (e.g., 330 ms for the example described above) (step 106). The control thread 16 then suspends the scanner thread 18 for the time remaining in the sampling period (e.g., 670 ms) (step 108). After 670 ms, the next sampling period begins (steps 110 and 104). This continues until all requested programs and files are scanned for viruses. If a virus is found, a dialog box which includes a list of actions (e.g., clean, delete, ignore, quarantine) that a user can request the antivirus program to perform on the infected file may be displayed. The antivirus program may also perform a default action on the infected file.

The second method (shown in the flowchart of FIG. 7) forces the CPU usage by the scan engine 14 towards an average value. The control thread 16 measures the amount of time the scanner thread spent executing during the time it was allowed to run during the first sampling period and adjusts the next suspend (sleep) period accordingly. For example, if during the one second sampling period, the scanner thread 18 was awake for 330 ms but only used 220 ms of processor time, the suspend/run ratio during the next second sampling period will be adjusted as follows:

330 ms*(330 ms/220 ms)=495 ms

If during the next one second sampling period the scanner thread uses all of its available 495 ms, the suspend/run ratio will be adjusted downward for the next sampling period.

Figure 8:
FIG. 8 is a graph of percent CPU usage by the scan engine versus time with an average CPU usage of 33% selected in the process shown in FIG. 7.

This method may result in wide variations in processor usage, however, the average corresponds generally to the requested CPU usage. The reason for the wide variation is that the scanner is dependent on access to the hard drive or other storage media. The scanner thread may be using zero percent of the processor while it is waiting for data to be retrieved from the drive, and then use one, hundred percent while processing the data (i.e., scanning the files). To provide a smoother graph (see FIG. 8), the ratio calculation is preferably performed using a fraction (e.g., one-half, one third) of the difference between the actual CPU usage and the desired CPU usage. This prevents the control thread 16 from over correcting the CPU usage by the scanner thread 18. A user will then be able to i, see that the scanner is behaving as configured, if the user is using a performance monitoring tool, such as PERFMON on WINDOWS NT, for example.

Figure 7:
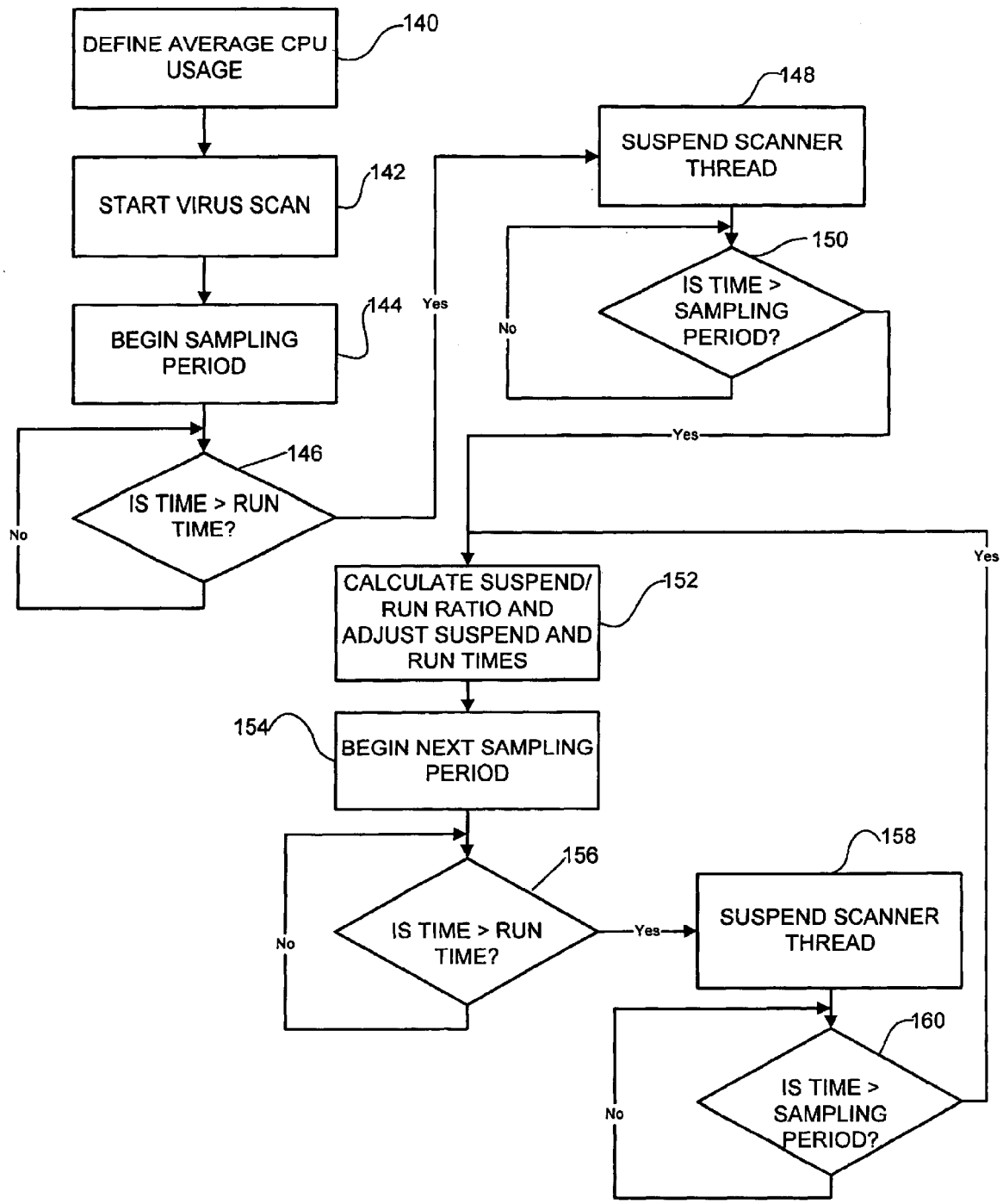
FIG. 7 is a flowchart illustrating a process for providing an average CPU usage by the scan engine.

The flowchart of FIG. 7 illustrates a process for limiting CPU usage by the scan engine 14 according to the method described above. The user first defines an average percent of CPU the scan engine 14 can use during its scanning operation (step 140). As previously described, a default value may also be used. The virus scanning is then started at the beginning of the first sampling period (steps 142 and 144). The run time is calculated as described above with respect to the first method for the first sampling period and the scanner thread is run for its specified time (step 146). At the end of the run time, the scanner thread 18 is suspended for the time remaining in the sampling period (steps 148 and 150). At the end of the first sampling period the suspend/run ratio is calculated based on the amount of processor time that the scanner thread 18 used when it was awake, and the suspend and run times are adjusted accordingly (step 152). The control thread 16 runs through the next sampling period (steps 154–160) and a new suspend/run ratio is calculated (step 152).

It will be observed from the foregoing that the system and method described herein provide numerous advantages. Importantly, the system and method allow for detection of viruses without significantly impacting the amount of CPU available for other applications so that a user can continue with normal operation of the applications being used without substantial interference.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for limiting processor utilization by a virus scanner operable to scan data for viruses, the method comprising:

defining a processor utilization value;

running the virus scanner;

temporarily suspending running of the virus scanner such that usage of the processor is generally limited to said processor utilization value;

wherein defining a processor utilization value comprises defining a maximum value and temporarily suspending running of the virus scanner limits said processor utilization value to said maximum value;

wherein a control thread is executed over a sampling period;

wherein suspending the running of the virus scanner comprises suspending the virus scanner for a suspend time period equal to the sampling period multiplied by one minus the maximum value.

2. The method of claim 1 wherein running the virus scanner comprises executing a scanner thread.

3. The method of claim 2 wherein suspending the virus scanner comprises executing the control thread operable to suspend execution of the scanner thread.

4. The method of claim 1 wherein the virus scanner is an on-demand scanner.

5. The method of claim 1 wherein defining a processor utilization value comprises displaying a dialog box on a screen of a computer to allow a user to select the utilization value.

6. The method of claim 5 wherein the dialog box on the screen includes a slider bar.

7. The method of claim 5 wherein the dialog box on the screen includes a plurality of check boxes.

8. The method of claim 1 wherein defining a processor utilization value comprises defining a default value.

9. The method of claim 1 wherein the processor utilization value includes 33%.

10. A system for limiting processor utilization by a virus scanner comprising:

a virus scanner operable to scan data for viruses;

a processor operable to execute a scanner thread to scan the data; and a controller configured to temporarily suspend execution of the scanner thread to limit processor utilization by the virus scanner;

wherein a processor utilization value is defined by defining a maximum value and temporarily suspending running of the virus scanner limits said processor utilization value to said maximum value;

wherein a control thread is executed over a sampling period;

wherein suspending the execution of the virus scanner comprises suspending the virus scanner for a suspend time period equal to the sampling period multiplied by one minus the maximum value.

11. The system of claim 10 further comprising a graphical user interface configured to allow a user to enter a preferred processor utilization value.

12. The system of claim 11, wherein the graphical user interface includes a slider bar.

13. The system of claim 11 wherein the graphical user interface includes a plurality of check boxes.

14. The system of claim 10 wherein the virus scanner is an on-demand scanner.

15. The system of claim 10 wherein the controller is a control thread operable to instruct an operating system to suspend execution of the scanner thread.

16. The system of claim 10 wherein the processor utilization value includes 33%.

17. A computer program product embodied on a computer readable medium for limiting processor utilization by a virus scanner, comprising:

computer code that defines a processor utilization value;

computer code that runs the virus scanner;

computer code that temporarily suspends running of the virus scanner so that usage of a processor is generally limited to the processor utilization value; and a computer readable medium that stores said computer codes;

wherein said processor utilization value is defined by defining a maximum value and temporarily suspending running of the virus scanner limits said processor utilization value to said maximum value;

wherein a control thread is executed over a sampling period;

wherein suspending the execution of the virus scanner comprises suspending the virus scanner for a suspend time period equal to the sampling period multiplied by one minus the maximum value.

18. The computer program product of claim 17 wherein the computer readable medium is selected from the group consisting of CD-ROM, floppy disk, tape, flash memory, system memory, and hard drive.

19. The computer program product of claim 17 further comprising code that displays a graphical display to a user requesting the user to define the processor utilization value.

20. The computer program product of claim 19 wherein the graphical display includes a slider bar.

21. The computer program product of claim 19 wherein the graphical display includes a plurality of check boxes.

22. The computer program product of claim 17 wherein the processor utilization value includes 33%.

* * * * *